United States Patent [19]

Hochdanninger et al.

[11] Patent Number: 5,341,999
[45] Date of Patent: Aug. 30, 1994

[54] FIRE BRIGADE TRUCK

[75] Inventors: Franz Hochdanninger, Lauffen; Helmut Peherstorfer, Hartkirchen, both of Austria

[73] Assignee: Rosenbauer International Aktiengesellschaft, Leonding, Austria

[21] Appl. No.: 56,177

[22] Filed: May 3, 1993

[30] Foreign Application Priority Data

May 7, 1992 [AT] Austria .................... A928/92

[51] Int. Cl.[5] .................... B65H 75/42
[52] U.S. Cl. .................... 242/397.1; 137/355.12
[58] Field of Search .................... 242/86.2, 86, 86.1, 242/86.5 R, 86.7, 86.8; 191/12.2 A; 137/355.12, 355.24, 355.26, 355.27; 169/24, 62

[56] References Cited

U.S. PATENT DOCUMENTS

| | | | |
|---|---|---|---|
| 3,291,256 | 12/1966 | Eitel | 242/86.5 R |
| 3,774,630 | 11/1973 | Prange | 137/355.26 |
| 3,810,487 | 5/1974 | Cable et al. | 137/355.12 |
| 4,540,017 | 9/1985 | Prange | 137/355.12 |
| 5,211,245 | 5/1993 | Relyea et al. | 169/24 |

Primary Examiner—John M. Jillions
Attorney, Agent, or Firm—Collard & Roe

[57] ABSTRACT

A fire brigade truck for technical operations comprises at least one supply line, which is connected to an energy source and is adapted to be wound up on a reel accommodated in the body of the truck and comprises a fitting for coupling to a tool or other implement, a boom structure is provided on the truck and comprises a pole and a boom that is carried by said pole and disposed above the body of the truck and pivotally movable about a vertical axis and at its free end is provided with a depending arm, which carries a supply head adapted to be disposed on such a level that is can conveniently be reached by a person standing on the ground, the supply lines extend and are longitudinally movable from the associated reels to the pole and along the pole, boom, and arm as far as to the supply head, and the supply head comprises holders for detachably retaining the supply lines adjacent to the fittings, preferably at tools coupled to said fittings.

9 Claims, 1 Drawing Sheet

FIRE BRIGADE TRUCK

BACKGROUND OF THE INVENTION

1. Field of the Invention

This invention relates to a fire brigade truck for technical operations, comprising at least one supply line, which is connected to an energy source and is adapted to be wound up on a reel accommodated in the body of the truck and comprises a fitting for coupling to a tool or other implement.

2. Description of the Prior Art

In the operations of fire brigades there is a large demand for tools and other implements which are hydraulically, pneumatically or electrically operated, for jet pipes and for other means which depend on a supply of energy. For this reason a fire brigade truck for technical operations must be provided not only with the conventional tools and other implements but also with suitable energy sources and energy supply lines. Such energy supply lines may consist of electric cables or hydraulic or pneumatic lines and are wound up on reels, which are provided in the body of the truck at readily accessible locations and from which each supply line can be pulled in case of need. From the aspect of space utilization the reels provided with the supply lines must be distributed around the truck and in use some reels will be disposed on that side of the vehicle which is remote from the operational location; this will depend on the position of the truck relative to said location, and it will then be difficult to pull the supply lines from the truck to the operational location; unnecessarily long supply lines must be provided; there is an intricate tangel of lines about the truck; and losses of time required for the coupling of the tools and other implements to the supply lines when they have been extended to the operational location cannot be avoided; and the firemen by whom the supply lines are extended and the connected tools and other implements are handled may interfere with each other.

SUMMARY OF THE INVENTION

For this reason it is an object of the invention to eliminate said disadvantages and to provide a fire brigade truck which is of the kind described first hereinbefore and which ensures that an orderly arrangement for supplying energy to the tools and other implements required for the operations of the fire brigade can efficiently and conveniently be established.

This object is accomplished in accordance with the invention in that a boom structure is provided on the truck and comprises a pole and a boom that is carried by said pole and disposed above the body of the truck and pivotally movable about a vertical axis and at its free end is provided with a depending arm, which carries a supply head adapted to be disposed on such a level that is can conveniently be reached by a person standing on the ground, the supply lines extend and are longitudinally movable from the associated reels to the pole and along the pole, boom, and arm as far as to the supply head, and the supply head comprises holders for detachably retaining the supply lines adjacent to the fittings, preferably at tools coupled to said fittings. Regardless of the locations of the several reels in the body of the truck, all supply lines extend to the supply head so that said supply head constitutes a central source of energy. Because the boom is pivotally movable the supply head and said central source of energy can be moved close to a desired operational location so that it is sufficient to extend each supply line over a short distance from the supply head to such operational location. Because the supply lines with the associated fittings and optionally with the coupled tools can simply be taken from the holders of the supply head and because they are guided along the pole, boom, and arm they can be pulled from the supply head, each of said supply lines can quickly be moved to a desired operational location. Each supply line which is required to be used is pulled from the supply head and even if a plurality of supply lines are required they will automatically be laid from the truck to the operational location substantially parallel to each other and in an orderly arrangement. The tools are desirably coupled to the fittings of the supply lines and retained in the holders so that the tools can be taken from the supply head without delay and can be moved to the operational location together with the supply line and tools will always be available which correctly coupled to the associated supply lines and are ready for immediate use. The orderly arrangement of the extended supply lines also results in a wider range of the tools and valuable accessible stowage space is provided in the body of the truck because the reels previously accommodated in the truck can now be provided at any desired locations.

It would be possible to provide a simple boom, which has a sufficient length and together with the associated supply head can be pivotally moved around the truck. But if the roof of the truck is provided with upwardly protruding structures or if the pole cannot be centrally mounted on the truck, it will be desirable to provide a rotatable telescopic pole and/or a telescopic boom. In that case the pole can be raised and lowered and the boom can be extended and retracted to move the supply head to a desired optimum position even if the structural arrangement on the truck is not favorable. The rotatable pole is preferably provided with a lifting drive. A drive for extending and retracting the boom will not be required because it can easily be actuated by hand at the supply head. It will be understood that the adjustability of the boom will increase its range and the angle through which it can be pivotally moved that the adjustable boom can more easily be accommodated at the truck and be moved to a desirable inoperative position, in which the boom is not disturbing.

To simplify the winding up of the supply lines, when they have been extended, the reels are provided with winding drives and the supply head is provided with switches for initiating the operation of the winding drives of the reels. In that case the supply lines can conveniently be accommodated after use because it will be sufficient for the operator to walk to the supply head and to actuate the switch so that the supply line will then be wound up.

If the boom is provided with lighting means, it will be possible to provide in addition to the central source of energy an optimum lighting for any given operational location because in use the boom is directed to the operational location so that the light projectors will also be directed to the operational location.

DETAILED DESCRIPTION OF THE PREFERRED EMBODIMENT

Figure 1:
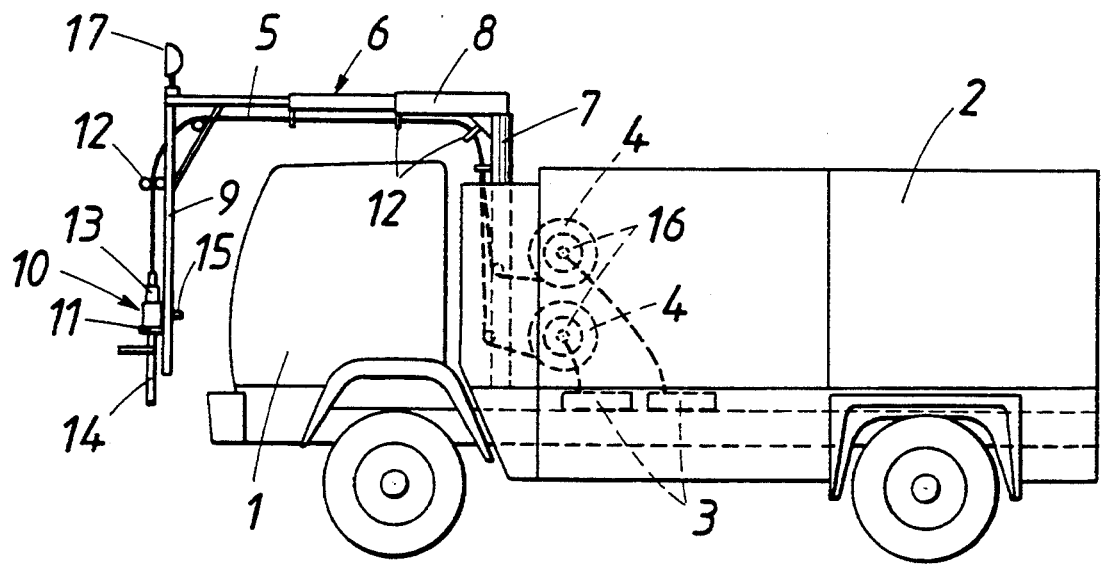
FIGS. 1 and 2 are, respectively, a side elevation with a top plan view showing a fire brigade truck embodying the invention.

An illustrative embodiment of the invention will now be described with reference to the schematic drawing.

A fire brigade truck 1 for technical operations comprises a boxlike body 2 for accommodating various tools and other implements. To permit a use of hydraulic rescuing implements, pneumatic tools, electric implements, jet pipes and other implements which require a supply of energy, suitable energy sources 3 are provided in the truck body 2 and may consist, e.g., of hydraulic pumps, surge tanks, and storage batteries, and reels 4 for winding up the required supply lines 5 are accommodated in the body 2. For a coordination of the means for supplying energy and for providing at the truck a central source of energy, the truck is provided with a boom structure 6, which is mounted for rotation about a vertical axis and is composed of a pole 7, which is rotatable about said axis, and a boom 8, which is carried by the pole 7 and disposed above the box 2. The boom 8 is provided at its free end with a depending arm 9 for carrying a supply head 10, which is adapted to be disposed on such a level that it can conveniently be reached by a person standing on the ground. The supply head 10 comprises holders 11 for detachably retaining respective supply lines 5. The supply lines 5 extend from the respective reels 4 to the pole 7 and along the pole 7, the boom 8, and the arm 9 to the supply head 10 and are longitudinally movable in contact with rollers 12 or other guiding means provided on the pole 7, the boom 8, and the arm 9. Each supply line is provided with a fitting 13 for coupling a tool 14 or other implement and said fittings 13 or the tools 14 coupled thereto are detachably retained or fitted in the holders 11 of the supply head 10.

By means of the boom 8 the supply head 10 to which the supply lines 5 extend can be pivotally moved to a position in which the supply head 10 is close to a desired operational location so that the supply lines can be pulled over a short distance to such operational location. For that purpose it will be sufficient to take the desired fitting 13 or tool 14 from the associated holder 11 of the supply head 10 and to move such fitting or tool to the operational location, whereby the associated supply line 5 will be unwound from the associated reel 4 and pulled along the pole 7, boom 8, and arm 9. The supply lines 5 can conveniently be extended to form an orderly arrangement and the tools 14 will be ready for use without a delay.

Figure 2:
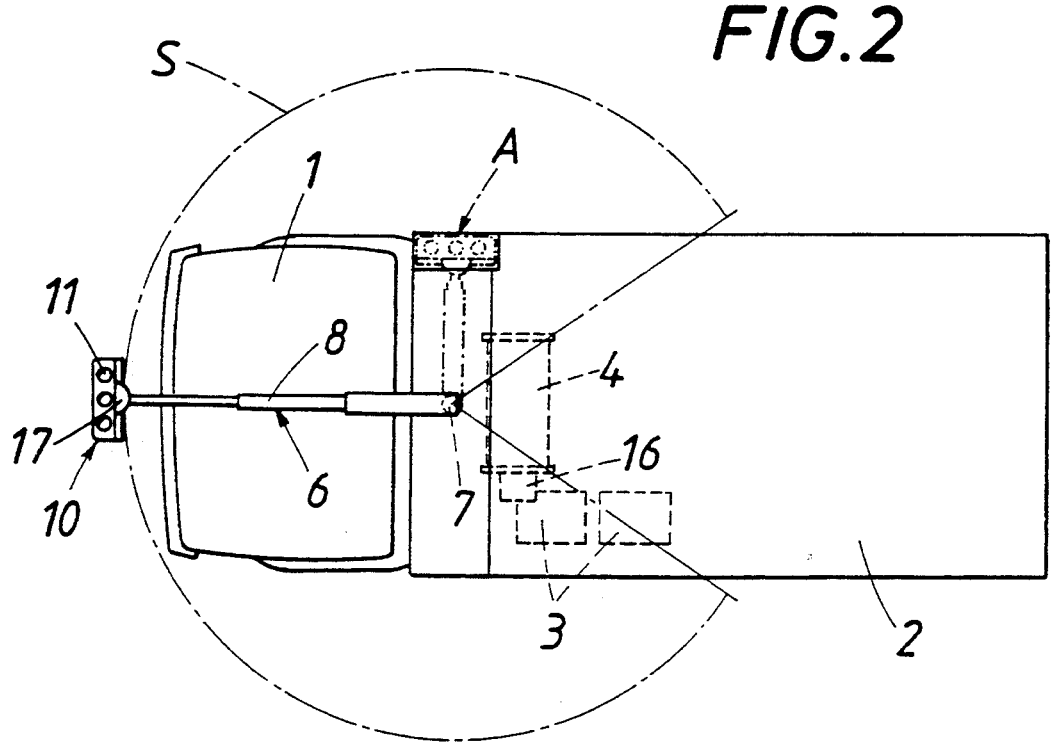

In the illustrated embodiment the boom 8 can be telescopically extended and retracted so that the range 6 through which the boom 8 can be pivotally moved can be adapted to the contour of the truck. In practice it will usually be sufficient to provide for a pivotal movement of the boom 8 to positions at the front end and sides of the truck. The boom 8 can be retracted to protrude only slightly in an inoperative position A, in which the boom structure 6 can conveniently be arranged and will not interfere with other operations of the truck, as is indicated in phantom in FIG. 2. If the rotatable pole 7 can be telescopically raised, it will be possible to raise the boom 8 above certain structures on the roof of the fire brigade truck 1 and to increase the number of operations which can be performed by the boom structure 6.

The supply head 10 is suitably provided with switches 15 for initiating the operation of winding drives 16 associated with the reels 4. In that case the winding of the extended supply lines after their use can be initiated from the supply head. Lighting means 17 may be provided on the boom structure 6 so that in addition to the central energy supply source such lighting means can be directed to the operational location.

We claim:

1. In a fire brigade truck for technical operations, comprising
    a plurality of energy sources,
    a truck body,
    a plurality of energy supply lines connected to respective ones of said energy sources and provided each with a fitting for detachably mounting an implement, and
    a plurality of reels, which are accommodated in said body and associated with respective ones of said supply lines and each of which is operable to wind up the associated supply line,
    the improvement residing in that
    said truck is provided with a boom structure comprising a pole, a boom, which is mounted on said pole and extends above said body and is pivotally movable about a vertical axis and has a free end, and an arm, which depends from said free end of said boom and carries a supply head adapted to be disposed on such a level that is can conveniently be reached by a person standing on the ground,
    each of said supply lines extends from the associated reel to said pole and along said pole, boom, and arm to said supply head,
    said supply head comprises a plurality of holders for detachably retaining respective ones of said supply lines adjacent to said fittings, and
    said boom structure is provided with means for guiding each of said supply lines along said pole, boom, and arm so that each of said supply lines is adapted to be extended from the associated holder to a desired operational location.

2. The improvement set forth in claim 1, wherein at least one said fitting is provided with an implement consisting of a tool.

3. The improvement set forth in claim 2, wherein at least one of said tools is detachably retained in one of said holders.

4. The improvement set forth in claim 1, wherein at least one of said fittings is detachably retained in one of said holders.

5. The improvement set forth in claim 1, wherein said pole is telescopic.

6. The improvement set forth in claim 5, wherein said boom is telescopic.

7. The improvement set forth in claim 1, wherein said boom is telescopic.

8. The improvement set forth in claim 1, wherein
    each of said reels is provided with drive means, which are operable to wind up the associated supply line on said reel, and
    said supply head is provided with switches for initiating the operation of each of said drive means.

9. The improvement set forth in claim 1, wherein said boom structure is provided adjacent to the free end of said boom with lighting means for illuminating a desired operational location.

* * * * *